United States Patent
Zhang et al.

(10) Patent No.: US 10,949,126 B2
(45) Date of Patent: Mar. 16, 2021

(54) SOLID-STATE STORAGE DEVICE SPEED PERFORMANCE AND ENDURANCE THROUGH HOST-SIDE DATA CLASSIFICATION AND EMBEDDED WRITE CACHING

(71) Applicant: ScaleFlux, Inc., San Jose, CA (US)

(72) Inventors: Tong Zhang, Albany, NY (US); Yang Liu, Milpitas, CA (US); Fei Sun, Irvine, CA (US); Hao Zhong, Los Gatos, CA (US)

(73) Assignee: SCALEFLUX, INC., San Jose, CA (US)

( * ) Notice: Subject to any disclaimer, the term of this patent is extended or adjusted under 35 U.S.C. 154(b) by 0 days.

(21) Appl. No.: 16/521,739

(22) Filed: Jul. 25, 2019

(65) Prior Publication Data

US 2021/0026558 A1 Jan. 28, 2021

(51) Int. Cl.
*G06F 12/00* (2006.01)
*G06F 3/06* (2006.01)
*G06F 12/10* (2016.01)

(52) U.S. Cl.
CPC .......... *G06F 3/0659* (2013.01); *G06F 3/0611* (2013.01); *G06F 3/0656* (2013.01); *G06F 3/0679* (2013.01); *G06F 12/10* (2013.01); *G06F 2212/657* (2013.01)

(58) Field of Classification Search
CPC .... G06F 3/0659; G06F 3/0611; G06F 3/0656; G06F 3/0679
See application file for complete search history.

(56) References Cited

U.S. PATENT DOCUMENTS

| | | | | |
|---|---|---|---|---|
| 9,348,761 | B1* | 5/2016 | Cummins | G06F 3/0673 |
| 10,296,451 | B1* | 5/2019 | Schneider | G06F 3/0604 |
| 2004/0167992 | A1* | 8/2004 | Carnevale | H04L 1/1607 709/250 |
| 2008/0198651 | A1* | 8/2008 | Kim | G11C 16/10 365/185.03 |
| 2008/0270682 | A1* | 10/2008 | Lasser | G11C 11/5628 711/103 |
| 2009/0113121 | A1* | 4/2009 | Lee | G06F 12/0246 711/103 |
| 2009/0196103 | A1* | 8/2009 | Kim | G11C 16/10 365/185.12 |
| 2009/0327601 | A1* | 12/2009 | Fienblit | G06F 11/2074 711/114 |
| 2012/0005668 | A1* | 1/2012 | Serizawa | G06F 12/0866 718/1 |
| 2012/0020155 | A1* | 1/2012 | Kim | G11C 16/10 365/185.03 |
| 2012/0079167 | A1* | 3/2012 | Yao | G06F 12/0246 711/103 |

(Continued)

*Primary Examiner* — Prasith Thammavong
(74) *Attorney, Agent, or Firm* — Hoffman Warnick LLC

(57) ABSTRACT

A method for host-side data classification according to embodiments, includes: writing a data sector directly from a host to a storage device; storing the data sector in the storage device; sending a write completion acknowledgement from the storage device to the host; in the background: classifying the data sector on the host to estimate an expected lifetime of the data sector; assigning a data type index to the data sector based on the expected lifetime of the data sector; and asynchronously sending the data type index for the data sector from the host to the storage device.

13 Claims, 6 Drawing Sheets

(56) References Cited

U.S. PATENT DOCUMENTS

| | | | |
|---|---|---|---|
| 2013/0254458 A1* | 9/2013 | Pittelko | G06F 12/0246 711/103 |
| 2013/0304966 A1* | 11/2013 | Joo | G06F 12/0246 711/103 |
| 2014/0310476 A1* | 10/2014 | Kruus | G06F 12/0871 711/133 |
| 2016/0147442 A1* | 5/2016 | Baderdinni | G06F 3/061 711/105 |
| 2017/0097909 A1* | 4/2017 | Simionescu | G06F 3/0656 |
| 2018/0260332 A1* | 9/2018 | Dunn | G06F 12/0868 |

* cited by examiner

SOLID-STATE STORAGE DEVICE SPEED PERFORMANCE AND ENDURANCE THROUGH HOST-SIDE DATA CLASSIFICATION AND EMBEDDED WRITE CACHING

TECHNICAL FIELD

The present invention relates to the field of solid-state data storage, and particularly to improving the speed performance and endurance of solid-state data storage devices using NAND flash memory.

BACKGROUND

Modern solid-state data storage devices, e.g., solid-state drives (SSDs), are built upon NAND flash memory chips. NAND flash memory cells are organized in an array→block-→page hierarchy: one NAND flash memory array is partitioned into a large number (e.g., a few thousands) of blocks, and each block contains a number (e.g., a few hundreds) of pages. NAND flash memory cells must be erased prior to writing data to the memory cells. All the NAND flash memory cells within the same block must be erased at the same time. Data are written/read in the unit of a page.

SSDs expose storage space in an array of logical block addresses (LBAs), and a host (e.g., a host computing system) can access SSDs (i.e., read and write data) through the LBAs. Because NAND flash memory does not support in-place data updates, subsequent data being written to the same LBA will be internally written to different physical storage locations in the SSDs. As a result, physical storage space in SSDs will gradually become more and more fragmented, requiring the SSDs to periodically carry out an internal garbage collection (GC) operation to reclaim stale physical storage space and reduce fragmentation. However, the GC operation will cause extra data write operations, which is referred to as write amplification. Larger write amplification will cause more degradation of SSD speed performance (i.e., throughput and latency) and endurance.

SUMMARY

Accordingly, the present disclosure is directed to methods and systems for improving solid-state data storage device speed performance and endurance.

A first aspect of the disclosure is directed to a method for host-side data classification according to embodiments. The method includes: writing a data sector directly from a host to a storage device; storing the data sector in the storage device; sending a write completion acknowledgement from the storage device to the host; in the background: classifying the data sector on the host to estimate an expected lifetime of the data sector; assigning a data type index to the data sector based on the expected lifetime of the data sector; and asynchronously sending the data type index for the data sector from the host to the storage device.

A second aspect of the disclosure is directed to a storage infrastructure, including: a host; and a storage device; wherein the storage device is configured to: store a data sector received from the host; and send a write completion acknowledgement to the host; and wherein, in the background, the host is configured to: classify the data sector to estimate an expected lifetime of the data sector; assign a data type index to the data sector based on the expected lifetime of the data sector; and asynchronously send the data type index for the data sector to the storage device.

BRIEF DESCRIPTION OF THE DRAWINGS

The numerous advantages of the present invention may be better understood by those skilled in the art by reference to the accompanying figures.

DETAILED DESCRIPTION

Reference will now be made in detail to embodiments of the disclosure, examples of which are illustrated in the accompanying drawings.

NAND flash memory does not support in-place data updates. As a result, solid-state storage devices (SSDs) suffer from internal data write amplification, which inevitably degrades the speed performance and endurance of the storage devices. Hence, it is highly desirable to minimize write amplification.

Writing data with similar lifetimes (i.e., how long the data will remain as valid) into the same flash memory block can significantly reduce write amplification in SSDs, leading to better SSD speed performance and endurance. Therefore, it is highly desirable to classify data in terms of their lifetime and accordingly write data with similar lifetimes into the same flash memory block. In general, there are two options to realize such data classification: (1) With the best knowledge about their own data, applications can directly provide data lifetime information to the underlying data storage sub-system. However, application source code must be modified to explicitly extract and provide the data lifetime information, which largely limits the practical applicability of this option. (2) Being transparent to applications, data classification is carried out within the data storage sub-system (e.g., filesystem, driver, or storage device). In this context, collecting and analyzing the characteristics of data write traffic is required. Although this option involves higher complexity for data classification and may not achieve the same classification accuracy as the first option, it is completely transparent to applications and hence can be easily deployed in practice.

To ensure practical feasibility and adoptability, the present disclosure focuses on the second option above, i.e., data classification is done transparently to the applications. In particular, the disclosure focuses on host-side filesystem/driver-based data classification.

Figure 1:
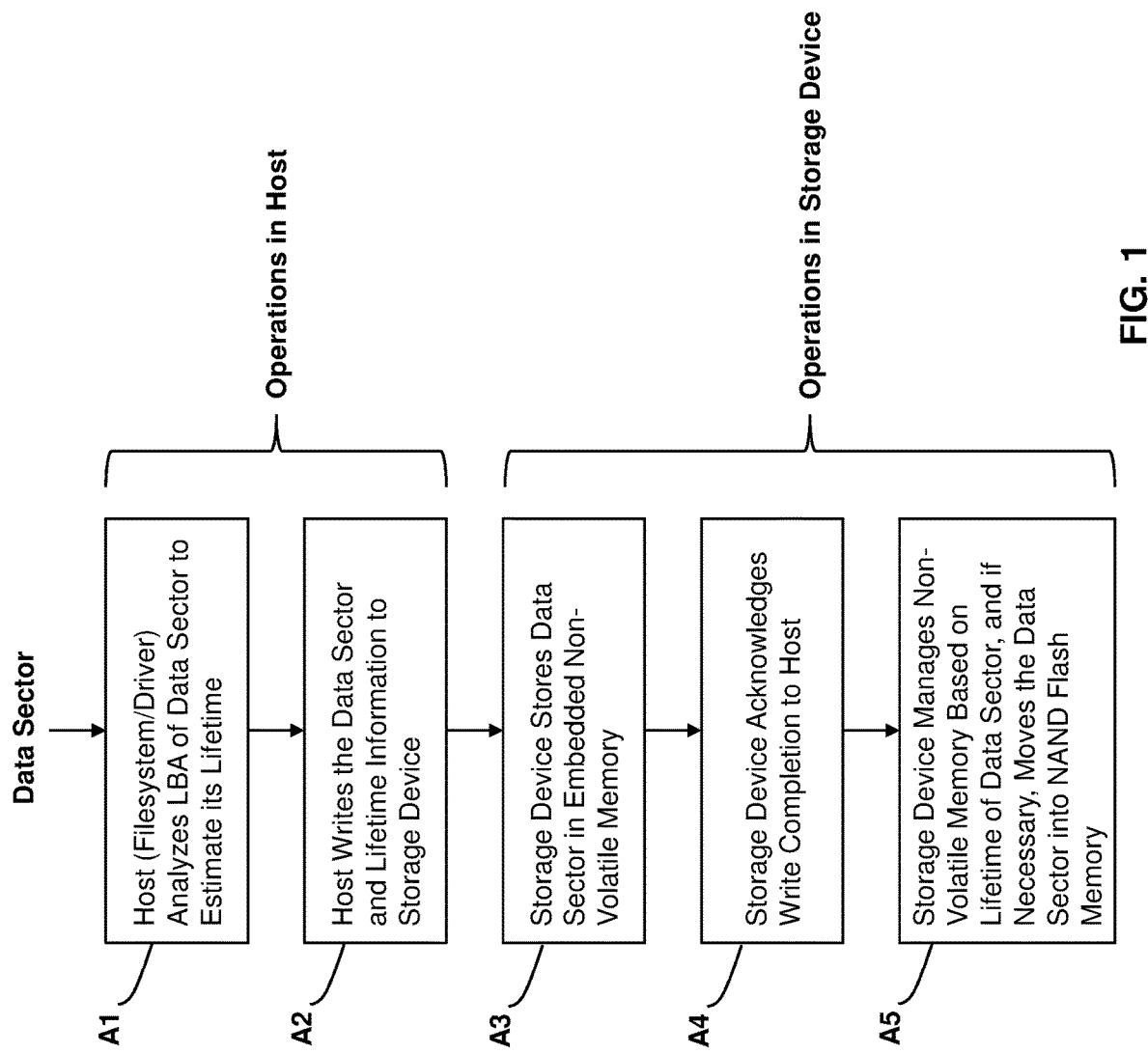
FIG. 1 illustrates an operational flow diagram of a process for using host-side data classification to improve the performance of solid-state data storage devices in current practice.

FIG. 1 illustrates an operational flow diagram of a conventional method for carrying out host-side data classification. In FIG. 1, processes A1 and A2 are performed at the host (e.g., via a filesystem/driver of a host computing system), while processes A3-A5 are performed at the storage device (i.e., SSD).

At process A1, upon receiving the logical block address (LBA) of a data sector being written to the storage device (e.g., by an application), the host analyzes the LBA of the data sector to estimate its expected lifetime. Then, at process A2, the host sends (writes) the data sector together with its lifetime information to the storage device. At process A3, the storage device stores the received data sector in its embedded non-volatile memory. At process A4, the storage device acknowledges the write completion to the host. At A5, the storage device manages the non-volatile memory based on the lifetime information of the data sector and, if necessary, moves the data sector into NAND flash memory at a later time.

Unfortunately, the conventional method depicted in FIG. 1 suffers from severe data write latency degradation. Modern SSDs always have internal embedded non-volatile memory (e.g., SRAM/DRAM powered by capacitors, or new non-volatile memory technologies such as phase-change memory and STT-RAM). Hence, SSDs always first buffer incoming data sectors in their internal embedded non-volatile memory (process A3) and then immediately acknowledge the write completion to the host (process A4). Internally, SSDs move data from the embedded non-volatile memory to NAND flash memory at a later time (process A5), which is completely transparent to the host. This can minimize the write latency experienced by the host and hence improve the overall system speed performance. However, since host-side data classification directly inserts the data classification operation into the data write path from the application to the SSD, the application will inevitably experience a longer write latency, which can degrade overall system speed performance; the more accurate the data classification, the longer the data classification latency and the greater the degradation of the overall system speed performance. This leads to a trade-off between data classification accuracy and overall system speed performance.

In the present disclosure, the host-side data classification is completely decoupled from the data write path to eliminate the trade-off between data classification accuracy and the overall system speed performance. A storage infrastructure 10 capable of providing this functionality is depicted in FIG. 2.

Figure 2:
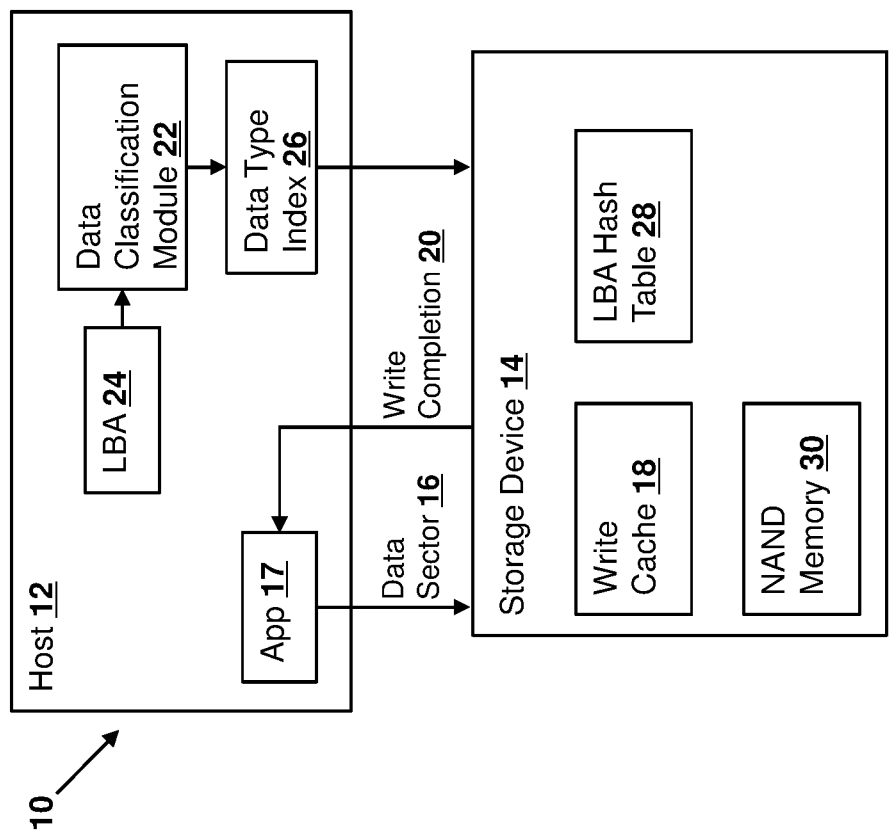
FIG. 2 depicts a storage infrastructure including a host and at least one solid-state data storage device according to embodiments.

In FIG. 2, the storage infrastructure 10 is shown as including a host 12 (e.g., a host computer system or server) and at least one solid-state data storage device 14 (hereafter referred to as storage device 14). A storage device 14 according to embodiments is depicted in greater detail in FIG. 4.

Figure 3:
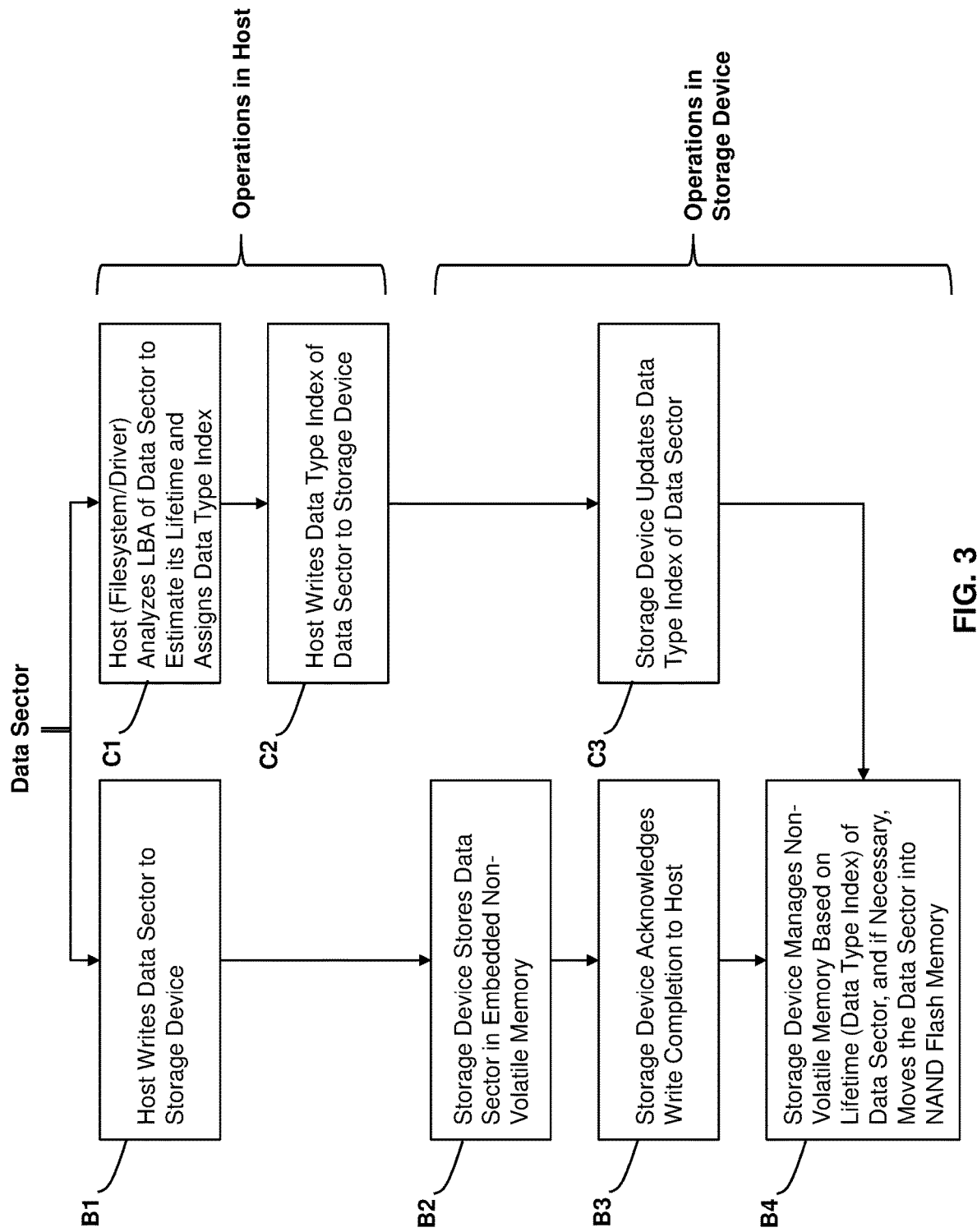
FIG. 3 illustrates an operational flow diagram of a process for eliminating write latency overhead caused by host-side data classification according to embodiments.
Figure 4:
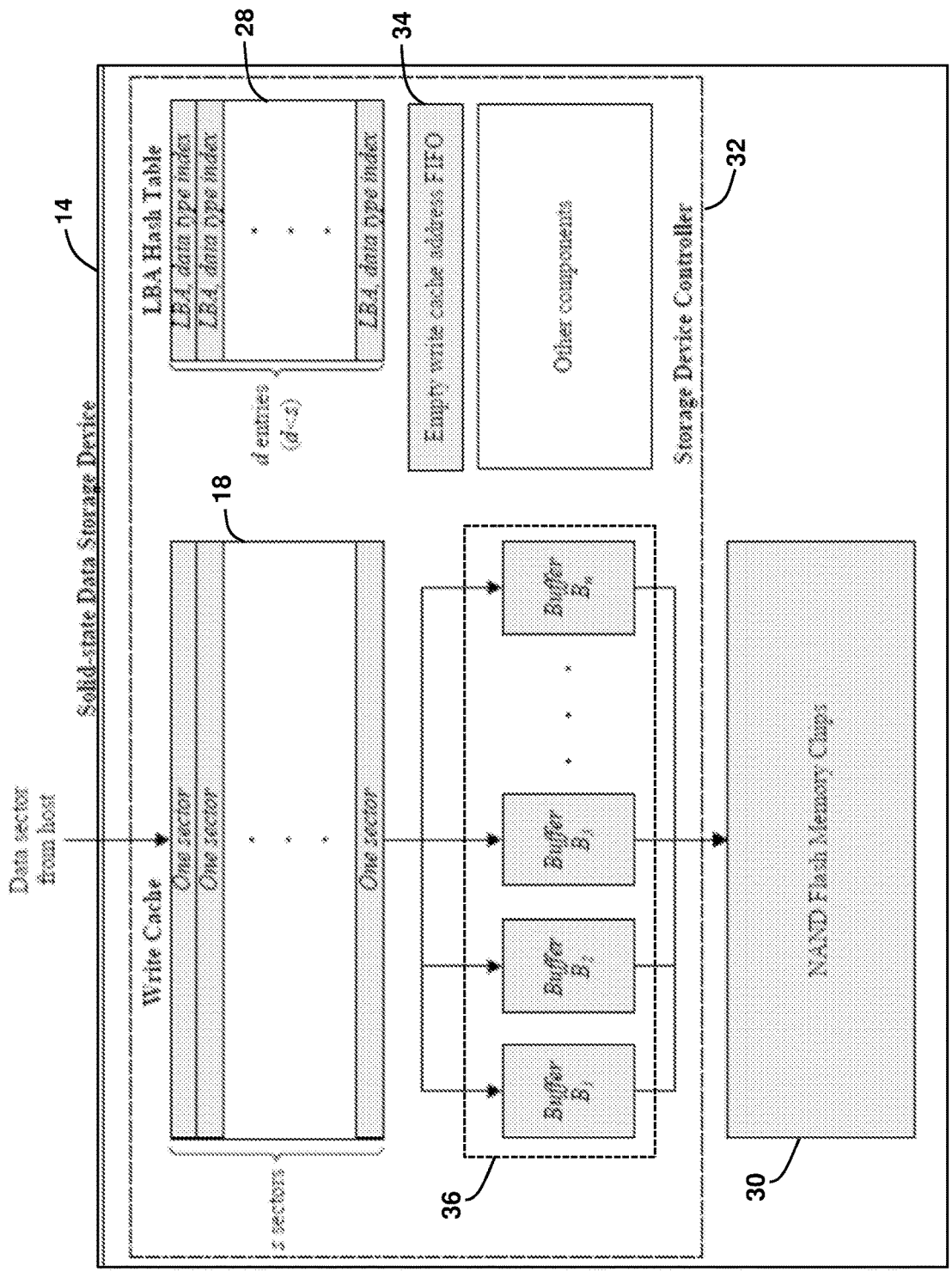
FIG. 4 illustrates the structure of a solid-state data storage device according to embodiments.

FIG. 3, described below with reference to FIGS. 2 and 4, illustrates an operational flow diagram of a method for eliminating write latency overhead caused by host-side data classification. In FIG. 3, processes B1, C1, and C2 are performed at the host 12, while processes B2-B4 and C3 are performed at the storage device 14.

At process B1, the host 12 directly writes a data sector 16 (e.g., on behalf of an application 17) to the storage device 14, without inserting any data classification operations into the data write path. At process B2, the data sector 16 is stored by the storage device 14 in its embedded non-volatile memory (write cache 18). The storage device 14 acknowledges the write completion 20 to the host 12 (and the application 17) at process B3.

In the background, at process C1, a data classification module 22 on the host 12 carries out data classification on the data sector 16 by analyzing the LBA 24 of the data sector 16 to estimate its expected lifetime. Based on the expected lifetime of the data sector 16, the data classification module 22 assigns a data type index 26 to the data sector 16. At process C2, the host 12 asynchronously sends the data type index 26 for the data sector 16 to the storage device 14. At process C3, the storage device 14 receives and updates the data type index 26 for the data sector 16 in an LBA hash table 28 in the storage device 14.

At process B4, after receiving the updated data type index 26 for the data sector 16 from the host 12 and updating the data type index 26 for the data sector 16 in the LBA hash table 28, the storage device 14 determines when/whether to move the data sector 16 from the write cache 18 to NAND flash memory 30. Advantageously, unlike the method of FIG. 1, the method depicted in FIG. 2 does not cause any extra write latency overhead for the application 17, leading to higher overall system speed performance.

The present disclosure further presents techniques that can fully take advantage of the lifetime information in storage devices. One objective is to ensure that data with shorter lifetimes have a higher probability of remaining in the embedded non-volatile memory of the storage device. This can maximize the effectiveness of using the embedded non-volatile memory to reduce the write traffic experienced by NAND flash memory.

FIG. 4 illustrates the structure of a storage device 14 according to embodiments. Assume host-side data classification (e.g., performed by the data classification module 22, FIG. 1) categorizes the data sectors 16 into n types, denoted as $C_1, C_2, \ldots, C_n$, where type-$C_i$ a data sectors 16 have a shorter lifetime than type-$C_{i+1}$ data. All of the incoming data sectors 16 are first written to a write cache 18 in the storage device 10. A storage device controller 32 manages the write cache 18 using an LBA hash table 28. Assume, for example, that the write cache 18 can store up to s data sectors 16 and that the LBA hash table 28 contains d≤s entries. For the LBA in the k-th entry of the LBA hash table 28, its associated data sector 16 is stored at the k-th position in the write cache 18. The storage device controller 32 also contains an empty write cache address FIFO 34 (first-in first-out) that holds the addresses of all the empty entries in the write cache 18. In addition to the LBA 24, each entry in the LBA hash table 28 also stores a data type index 26 (e.g., if the data sector 16 at the LBA 24 is classified as type-$C_i$, the data type index is i) and the address A of the corresponding data sector 16 in the write cache 18.

The storage device controller 32 also contains a set 36 of n small write buffers, denoted as $B_1, B_2, \ldots, B_n$. When moving type-$C_i$ data sectors 16 from the write cache 18 to NAND flash memory 30, the data sectors 16 are always first moved to the write buffer $B_i$. Once enough data sectors 16 (e.g., 8 or 16) have accumulated in one of the buffers $B_1, B_2, \ldots, B_n$, all of the data in that buffer $B_1, B_2, \ldots, B_n$ is written to the NAND flash memory 30 in order to improve the I/O bandwidth utilization of the NAND flash memory 30.

As described above, when a data sector 16 is written to the storage device 10, its corresponding data type index 26 is not yet known. According to embodiments, a data type index of 1 is always assigned to all of the incoming data sectors 16 that are stored in the write cache 18. Later, once the host-side data classification has processed the LBA 24 of a data sector 16 and determined its data type index 26, the storage device 10 will accordingly update the data type index 26 for the data sector 16 in the LBA hash table 28.

Figure 5:
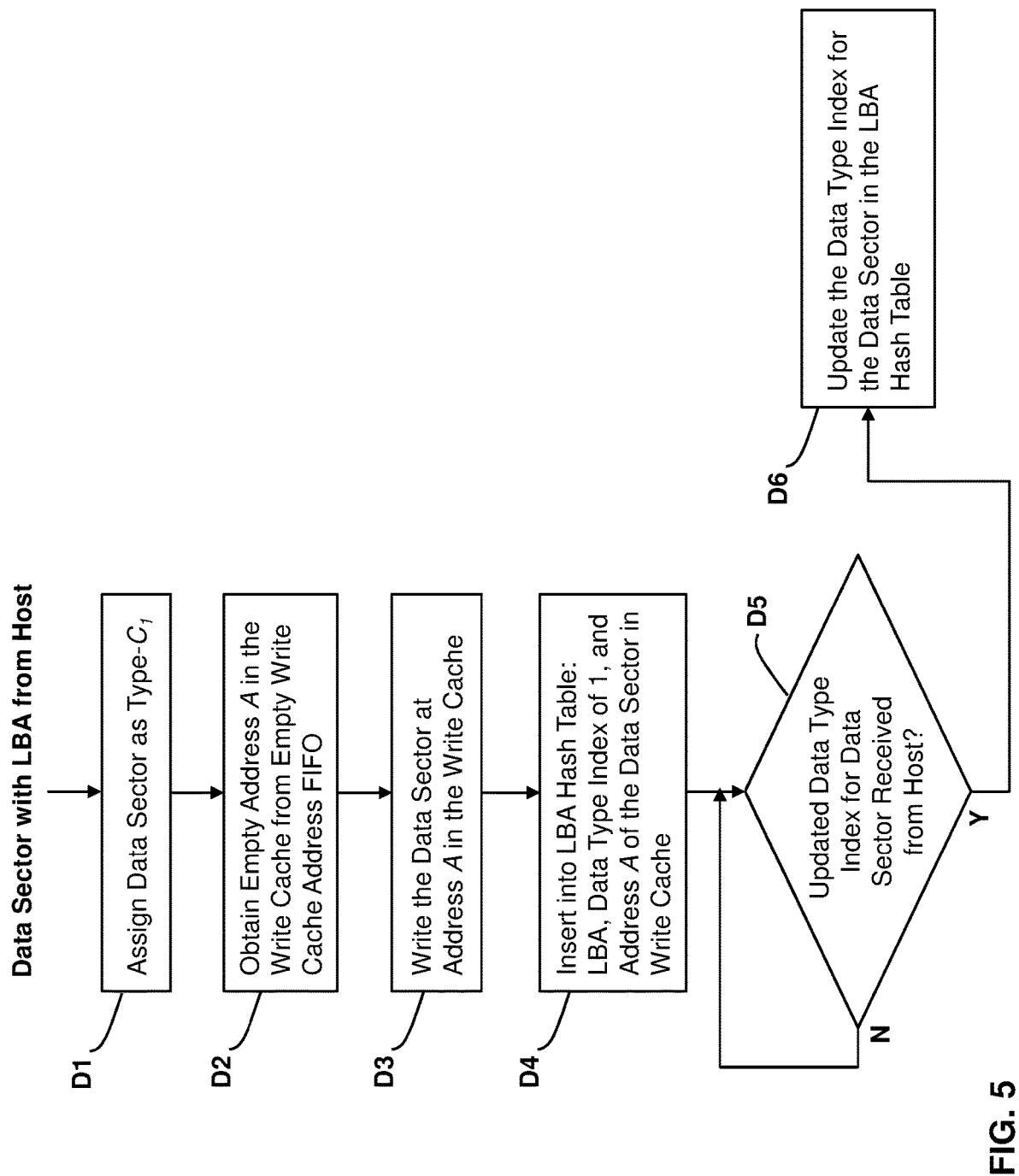
FIG. 5 illustrates an operational flow diagram of a process for inserting a new logical block address (LBA) into an LBA hash table according to embodiments.

FIG. 5 illustrates an operational flow diagram of a process for inserting a new LBA 24 into the LBA hash table 28 according to embodiments. At process D1, the data sector 16 is assigned as type-$C_1$ (i.e., data type index=1). At process D2, an empty address A in the write cache 18 is obtained from the empty write cache address FIFO 34. At process D3, the data sector 16 is stored at the empty address A in the write cache 18.

At process D4, the LBA 24 of the data sector 16 is inserted into an entry in the LBA hash table 28 together with a data type index 26 of 1 and the address A of the data sector 16 in the write cache 18. If an entry in the LBA hash table 28 is deleted during the insertion operation, the data sector 16 of that entry is moved from the write cache 18 to NAND flash memory 30. At a later time, after the host 12 has classified the data sector 16 and provided the updated type index 26 of the data sector 16 to the storage device 10 (YES at process D5), the corresponding LBA 24 entry for the data sector 16 in the LBA hash table 28 is updated at process D6 to include the updated data type index 26.

The LBA hash table 28 uses the LBA 24 of a data sector 16 as the input to the hash functions. According to embodiments, the principle of open addressing (also known as closed hashing) may be used to resolve hash collision. There are several well-known algorithms to implement open addressing, including for example, cuckoo hashing, linear probing, quadratic probing, and double hashing. Regardless of the specific algorithm being used, open addressing always examines one or multiple hash table entries when trying to resolve hash collision.

Figure 6:
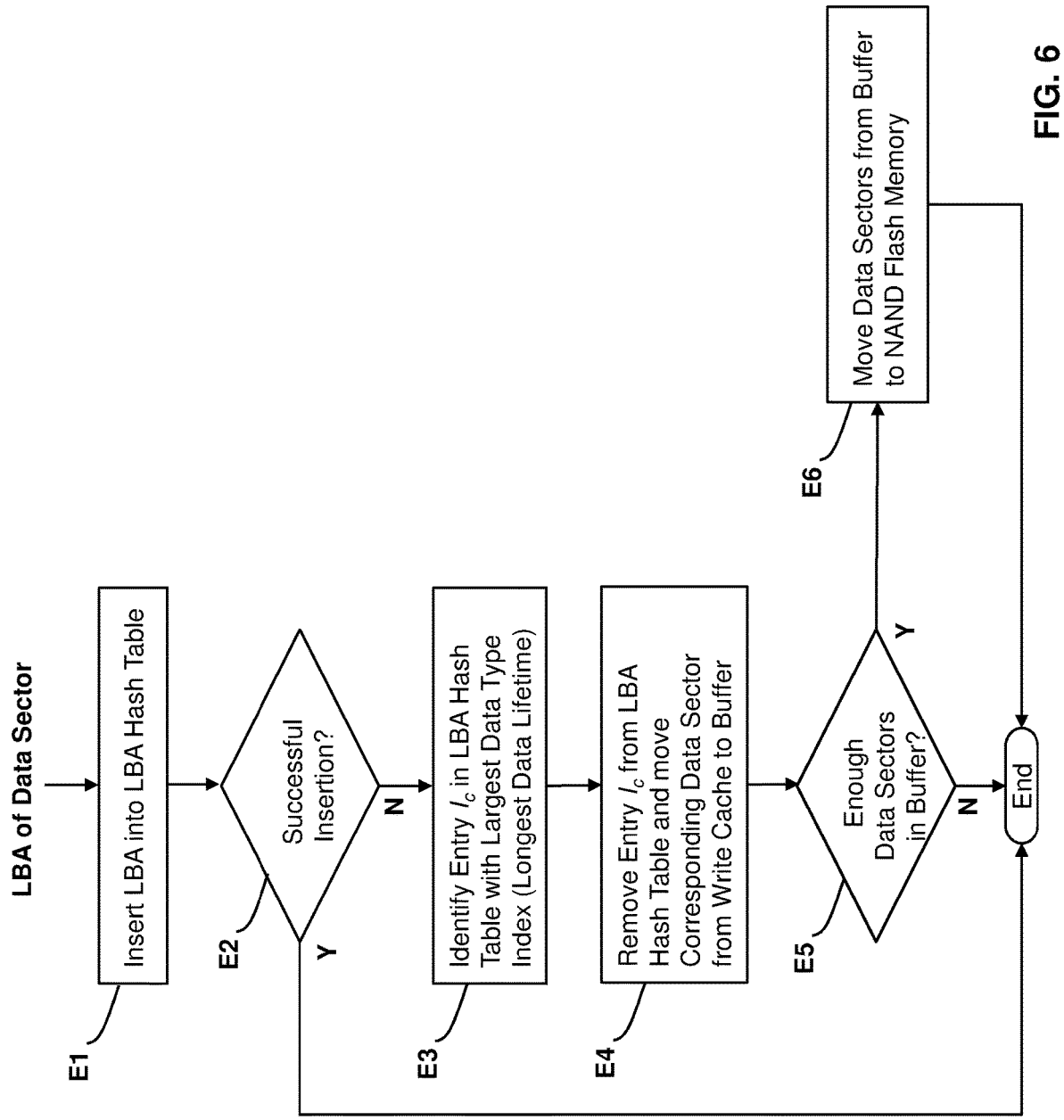
FIG. 6 illustrates an operational flow diagram of a process for inserting an LBA in the hash table of a solid-state data storage device according to embodiments.

FIG. 6 illustrates an operational flow diagram of a process for inserting a new LBA 24 into the LBA hash table 28. To ensure operational speed, open addressing algorithms typically set a maximum allowable number (denoted as $r_m$) of hash table entries that can be examined when trying to resolve hash collision. Let $I_1, \ldots, I_t$ denote the hash entries that have been examined when trying to resolve the hash collision. The insertion is claimed to fail if $t>r_m$ (i.e., too many hash table entries have been examined before the collision could be possibly resolved) or $I_1=I_t$ (i.e., the entries form an infinite loop).

At process E1, the LBA 24 of a data segment 16 is inserted into the LBA hash table 28. If the insertion is successful (YES at process E2), then the insertion process has succeeded. In the case of insertion failure (NO at process E2) flow passes to process E3.

At process E3, one entry of the LBA hash table 28 (denoted as $I_c$) is chosen that corresponds to the data sector 16 with the longest lifetime (i.e., its data type index is the largest) among all the t entries $I_1, \ldots, I_t$. The entry $I_c$ is subsequently removed from the LBA hash table 28 at process E4, and the associated data sector 16 is moved from the write cache 18 into the corresponding buffer $B_1$, $B_2, \ldots, B_n$. After removing the entry $I_c$ from the LBA hash table 28 at process E4, flow passes back to process E1, where the hash table insertion operation is repeated and is now guaranteed to succeed. If the buffer $B_1, B_2, \ldots, B_n$ has accumulated a large enough number of data sectors 16 (YES at process E5), the data sectors 16 are written from the buffer $B_1, B_2, \ldots, B_n$ to the NAND flash memory at process E6.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by hardware and/or computer readable program instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The invention claimed is:

1. A method for host-side data classification, comprising:
writing a data sector directly from a host to a storage device;
storing the data sector in the storage device;
sending a write completion acknowledgement from the storage device to the host;
in the background:
classifying the data sector on the host to estimate an expected lifetime of the data sector, wherein the classifying includes analyzing a logical block address (LBA) of the data sector to estimate its expected lifetime;
assigning a data type index to the data sector based on the expected lifetime of the data sector;
asynchronously sending the data type index for the data sector from the host to the storage device,
storing the data sector at an address in a write cache of the storage device;
assigning an initial value to the data type index of the data sector; and
inserting the LBA of the data sector, the initial value of the data type index of the data sector, and the address of the data sector in the write cache, in an LBA hash table of the storage device.

2. The method according to claim 1, further comprising updating the initial value of the data type index of the data sector in the LBA hash table of the storage device with the data type index received from the host.

3. The method according to claim 1, wherein the inserting further comprises:
obtaining an empty address in the write cache of the storage device; and
storing the data sector in the empty address of the write cache.

4. The method according to claim 1, further comprising determining if the LBA of the data sector has been successfully inserted into the LBA hash table.

5. The method according to claim 4, wherein, in the case of an unsuccessful insertion of the LBA into the LBA hash table:
identifying an entry in the LBA hash table corresponding to the data sector with the largest data type index;
removing the identified entry from the LBA hash table; and
moving the data sector with the largest data type index from the write cache to a buffer of the storage device.

6. The method according to claim 5, further comprising:
determining if the buffer of the storage device has accumulated a sufficient number of the data sectors; and
if the buffer of the storage device has accumulated a sufficient number of the data sectors, writing the data sectors from buffer to a memory of the storage device.

7. A storage infrastructure, comprising:
a host; and
a storage device;
wherein the storage device is configured to:
store a data sector received from the host; and
send a write completion acknowledgement to the host; and
wherein, in the background, the host is configured to:
classify the data sector to estimate an expected lifetime of the data sector, wherein the classifying includes analyzing a logical block address (LBA) of the data sector to estimate its expected lifetime;
assign a data type index to the data sector based on the expected lifetime of the data sector;
asynchronously send the data type index for the data sector to the storage device,
store the data sector at an address in a write cache of the storage device;
assign an initial value to the data type index of the data sector; and
insert the LBA of the data sector, the initial value of the data type index of the data sector, and the address of the data sector in the write cache, in an LBA hash table of the storage device.

8. The storage infrastructure according to claim 7, wherein the storage device is further configured to update the initial value of the data type index of the data sector in the LBA hash table with the data type index received from the host.

9. The storage infrastructure according to claim 7, wherein the storage device is further configured to:
obtain an empty address in the write cache of the storage device; and
store the data sector in the empty address of the write cache.

10. The storage infrastructure according to claim 7, wherein the storage device is further configured to:

determine if the LBA of the data sector has been successfully inserted into the LBA hash table.

11. The storage infrastructure according to claim 10, wherein, in the case of an unsuccessful insertion of the LBA into the LBA hash table, the storage device is further configured to:
   identify an entry in the LBA hash table corresponding to the data sector with the largest data type index;
   remove the identified entry from the LBA hash table; and
   move the data sector with the largest data type index from the write cache to a buffer of the storage device.

12. The storage infrastructure according to claim 11, wherein the storage device is further configured to:
   determine if the buffer has accumulated a sufficient number of the data sectors; and
   write the data sectors from the buffer to a memory of the storage device if the buffer has accumulated a sufficient number of the data sectors.

13. The storage infrastructure according to claim 7, wherein the storage device comprises a solid-state flash memory data storage device.

* * * * *